United States Patent
Jasper et al.

(10) Patent No.: US 7,314,169 B1
(45) Date of Patent: Jan. 1, 2008

(54) DEVICE THAT ISSUES AUTHORITY FOR AUTOMATION SYSTEMS BY ISSUING AN ENCRYPTED TIME PASS

(75) Inventors: Taryl J. Jasper, South Euclid, OH (US); Mark B. Anderson, Chapel Hill, NC (US); Craig D. Anderson, Hudson, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 423 days.

(21) Appl. No.: 10/953,945

(22) Filed: Sep. 29, 2004

(51) Int. Cl.
*G06K 5/00* (2006.01)
*G06K 7/01* (2006.01)
*G06F 15/16* (2006.01)
*G06F 7/04* (2006.01)
*H04K 1/00* (2006.01)
*H04L 9/00* (2006.01)

(52) U.S. Cl. .................. 235/382; 235/382.5; 709/229; 713/185; 713/186; 726/28

(58) Field of Classification Search ................ 235/382, 235/382.5; 713/182, 183, 184, 185, 186, 713/150; 726/26, 27, 28, 1
See application file for complete search history.

(56) References Cited

U.S. PATENT DOCUMENTS

| | | | |
|---|---|---|---|
| 7,003,558 B2 * | 2/2006 | Agrusa et al. ............... 709/223 |
| 2002/0031230 A1 * | 3/2002 | Sweet et al. ................. 380/278 |
| 2003/0120948 A1 * | 6/2003 | Schmidt et al. ............. 713/200 |
| 2004/0139312 A1 * | 7/2004 | Medvinsky .................. 713/150 |
| 2004/0162996 A1 * | 8/2004 | Wallace et al. ................. 726/1 |
| 2004/0167984 A1 * | 8/2004 | Herrmann .................... 709/229 |
| 2005/0050317 A1 * | 3/2005 | Kramer et al. .............. 713/155 |
| 2005/0229004 A1 * | 10/2005 | Callaghan .................... 713/185 |
| 2006/0026672 A1 * | 2/2006 | Braun ............................ 726/9 |
| 2006/0047830 A1 * | 3/2006 | Nair et al. ................... 709/229 |
| 2006/0155865 A1 * | 7/2006 | Brandt et al. ............... 709/230 |

OTHER PUBLICATIONS

J. Linn, "The Kerberos Version 5 GSS-API Mechanism", Jun. 1966, http://www.ietf.org/rfc/rfc1964.txt.*

* cited by examiner

*Primary Examiner*—Jared J. Fureman
(74) *Attorney, Agent, or Firm*—Amin Turocy & Calvin LLP; R. Scott Speroff

(57) ABSTRACT

An industrial automation security system comprises an access ticket relating to an industrial automation system. The access ticket comprises one or more restrictive attributes that restrict access rights to a portion of contents of the industrial automation system. A component that receives the access ticket grants access to the industrial automation system and the contents therein according to the one or more restrictive attributes.

33 Claims, 13 Drawing Sheets

DEVICE THAT ISSUES AUTHORITY FOR AUTOMATION SYSTEMS BY ISSUING AN ENCRYPTED TIME PASS

TECHNICAL FIELD

The subject invention relates generally to industrial system automation, and more particularly to providing access restrictions to automation systems/devices.

BACKGROUND OF THE INVENTION

Advancements in technology have enabled factory applications to become partially or completely automated. For example, applications that once required workers to put themselves proximate to heavy machinery and other various hazardous conditions can now be completed at a safe distance from such hazards. Further, imperfections associated with human action have been minimized through employment of highly precise machines. Many of these factory devices supply data related to manufacturing to databases that are accessible by system/process/project managers on a factory floor. For instance, sensors can detect a number of times a particular machine has completed an operation within a set amount of time. Further, sensors can deliver data to a processing unit relating to system alarms. Thus, a factory automation system can review collected data and automatically and/or semi-automatically schedule maintenance of a device, replacement of a device, and other various procedures that relate to automating a process.

Often in industrial automation environments, disparate systems and/or devices are provided by different vendors, thereby creating patchwork industrial systems that include systems/devices provided by the disparate vendors. Such patchwork industrial systems are partially or fully automated by control systems that are provided by a software vendor specializing in industrial automation. Further, industrial environments that include systems/devices provided by differing vendors typically employ security systems that facilitate ensuring that an industrial system/process is not compromised (e.g., the security systems can include alarms that are triggered upon certain pre-defined events). When one or more of the systems/devices within the industrial environment fail and/or require maintenance, a vendor who provided the device(s) frequently must perform the required maintenance on the devices, as such vendors may be in sole possession of knowledge, skill, and/or equipment necessary to repair/maintain the systems/devices.

Conventional industrial automation security systems provide unlimited access to industrial systems/devices to vendors that produce or sell such systems/devices to an end customer. In other words, security systems are disabled, thereby providing access to one or more vendors that are undertaking repair and/or maintenance relating to industrial systems/devices within the industrial automation environment. Such unlimited access can lead to undesirable results if the vendors are malicious and/or mistakes are made. For example, maintenance may be required on a particular device within an industrial automation environment, and a vendor providing such device can be invited on-site (or even off-site) to provide requisite repair/maintenance. Often, however, several identical devices exist within the industrial automation environment, thus causing confusion as to which device actually requires maintenance and/or repair. If an incorrect device is repaired, manufacturing can suffer as the un-repaired device remains faulty, or an un-maintained device will eventually fail, thereby creating another cost of repair and/or replacement. In another example, a malicious vendor with full access to an industrial automation environment can cause damage to systems/devices that are produced by a competitor, and/or obtain confidential information stored within such devices (e.g., recipes).

Other conventional industrial automation security systems have attempted to mitigate the aforementioned problems associated with granting unlimited access to individual vendors by providing time limits to access tickets. These tickets include an expiration time, and such expiration time is compared at an automation device with a current time. This approach is associated with substantial security issues. In particular, the automation devices must retain connectivity to a control authority to enable such time-restricted access. This is because Kerberos tickets utilize time provided by a central authority to undertake the aforementioned comparison. Furthermore, the Kerberos tickets are not encrypted or protected thereby enabling a hacker or other malicious entity to obtain unlimited access to an industrial automation system/device. For example, an authenticating authority can provide a time-limited access ticket (e.g., a Kerberos ticket) to a user upon authenticating user identity. These access tickets, however, do not sufficiently limit actions that can be undertaken by one or more of the vendors, as it is often required that timeframes of access be extensive. Moreover, the access ticket is not encrypted, thereby enabling a malicious entity to obtain such ticket and alter the ticket to obtain extended access and/or unauthorized access. For one particular example, it is extremely problematic if an access ticket expires when an access authority is disconnected from an industrial system/device that relies on access tickets provided by such access authority. In particular, if a user receives a ticket and it expires, the user will be unable to access an end device (e.g., a secured end device) or be able to renew the access ticket. Accordingly, time-limited access tickets often provide a user with an extensive access timeframe to ensure that the user will be able to obtain access to a system that often operates disconnected from the ticket issuing authority. Thus, these tickets are subject to fraud, theft, impersonation, and the like and can subject an industrial automation environment to security breaches.

In view of at least the above, there exists a need in the art for a system and/or methodology that effectively restricts access to automation systems and/or devices.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The subject invention mitigates many of the aforementioned deficiencies with respect to conventional security systems and methods. In particular, the subject invention provides a system and/or methodology for restricting access rights to those who request access to industrial systems/devices. In particular, an access ticket or other suitable data structure is created by a central access authority based at least in part upon an identity of a requesting entity and access rights associated with such requesting entity. For instance, the access ticket can include restrictions based upon actions of the requesting entity, location of the requesting entity, contents of an industrial system/device, time, or any other suitable access restrictions. The access ticket can then be relayed to an industrial system/device, which can grant the requesting entity access to such industrial system/device according to the restrictive attributes within the access ticket. Thus, for one particular example, a vendor can be called on-site to modify a portion of control logic in a controller, wherein such control logic includes instructions (and ingredients) for effectuating manufacture of a product whose recipe is desirably kept secret. Utilizing conventional security systems, the vendor would enter identifying indicia relating into the industrial system/device, and then obtain uninhibited access to such industrial system/device (thereby enabling the vendor to obtain the secret recipe). The subject invention can alleviate these concerns by providing an access ticket that restricts the vendor's access rights to particular functions, control logic, etc. For example, a conventional access ticket can restrict access to a printer for a particular period of time. The subject invention can render much more granular restrictions, such as restricting access to a particular color associated with the printer, restricting access to status/feedback information relating to the printer, and other suitable granular restrictions. Thus, the subject invention provides systems and/or methodologies for restricting access to automation systems/devices granularly.

The subject invention further provides a system and/or methodology for ensuring that an access ticket relating to an industrial system/device does not expire when the industrial system/device becomes disconnected from an access authority that administers and maintains the access ticket(s). More specifically, clocking mechanisms can be associated with both an access authority and an industrial system/device. In accordance with one aspect of the subject invention, the clocking mechanism associated with the access authority and the clocking mechanism associated with the industrial system/device can be synchronized while communicatively connected. The access authority can create an access ticket and provide an expiration time within such access ticket, and thereafter deliver the access ticket to the industrial system/device. Thus, a requester of access to the industrial system/device can obtain access thereto (restricted or otherwise). During an instance that the access authority and the industrial system/device become disconnected, the clocking mechanism associated with the industrial system/device can pause. Thus, an access ticket that is valid with respect to time will not become invalid while the industrial system/device is disconnected from the access authority.

In accordance with another aspect of the subject invention, pausing the clocking mechanism within the industrial system/device is optional, and can be determined based upon company policy. For instance, a particular company may find it undesirable to extend access of an access ticket upon the device being disconnected. Therefore, the clocking mechanism can employ a countdown approach in connection with determining whether an access ticket remains valid. Specifically, an access ticket can be granted by an access authority for a disconnected device, wherein such access ticket includes time restrictions. Upon presenting the access ticket to an automation device, the clocking mechanism within such automation device begins to "count down" according to the timeframe of access that is shown as allowable within the access ticket. Thereafter, even if the industrial system/device becomes disconnected, the clocking mechanism within the industrial automation controller continues to reduce an amount of access time. At an end of the stated expiration time, access can be denied. Thus, the subject invention contemplates both a clocking mechanism that pauses while an associated industrial automation system/device is disconnected, as well as a clocking mechanism that continues to count down (rather than comparing an expiration time with a stated time) when the industrial automation system/device is disconnected. As described above, this functionality can be selectable based at least in part upon company security policies and concerns.

The subject invention contemplates various systems and/or methodologies for verifying that a user is authorized to access an industrial system/device as well as encrypting access tickets that are delivered over a network. For instance, conventional usernames, passwords, and personal identification numbers (PINs) can be employed in connection with the subject invention to authenticate a requesting entity. Furthermore, biometric authentication, such as fingerprint analysis, voice analysis, facial feature analysis, and the like can be employed in connection with the subject invention. The access tickets of the subject invention can be encrypted and commissioned with keys, wherein the industrial system/device has sole knowledge of such keys. Therefore, only the industrial system/device can recognize the access ticket, and a hacker who intercepts such ticket will be unable to analyze contents thereof. Further, the access ticket can include a mechanism to detect tampering, thus further inhibiting hackers from manipulating the access tickets.

To the accomplishment of the foregoing and related ends, the invention then, comprises the features hereinafter fully described and particularly pointed out in the claims. The following description and the annexed drawings set forth in detail certain illustrative aspects of the invention. These aspects are indicative, however, of but a few of the various ways in which the principles of the invention may be employed and the subject invention is intended to include all such aspects and their equivalents. Other objects, advantages and novel features of the invention will become apparent from the following detailed description of the invention when considered in conjunction with the drawings.

DETAILED DESCRIPTION OF THE INVENTION

Figure 1:
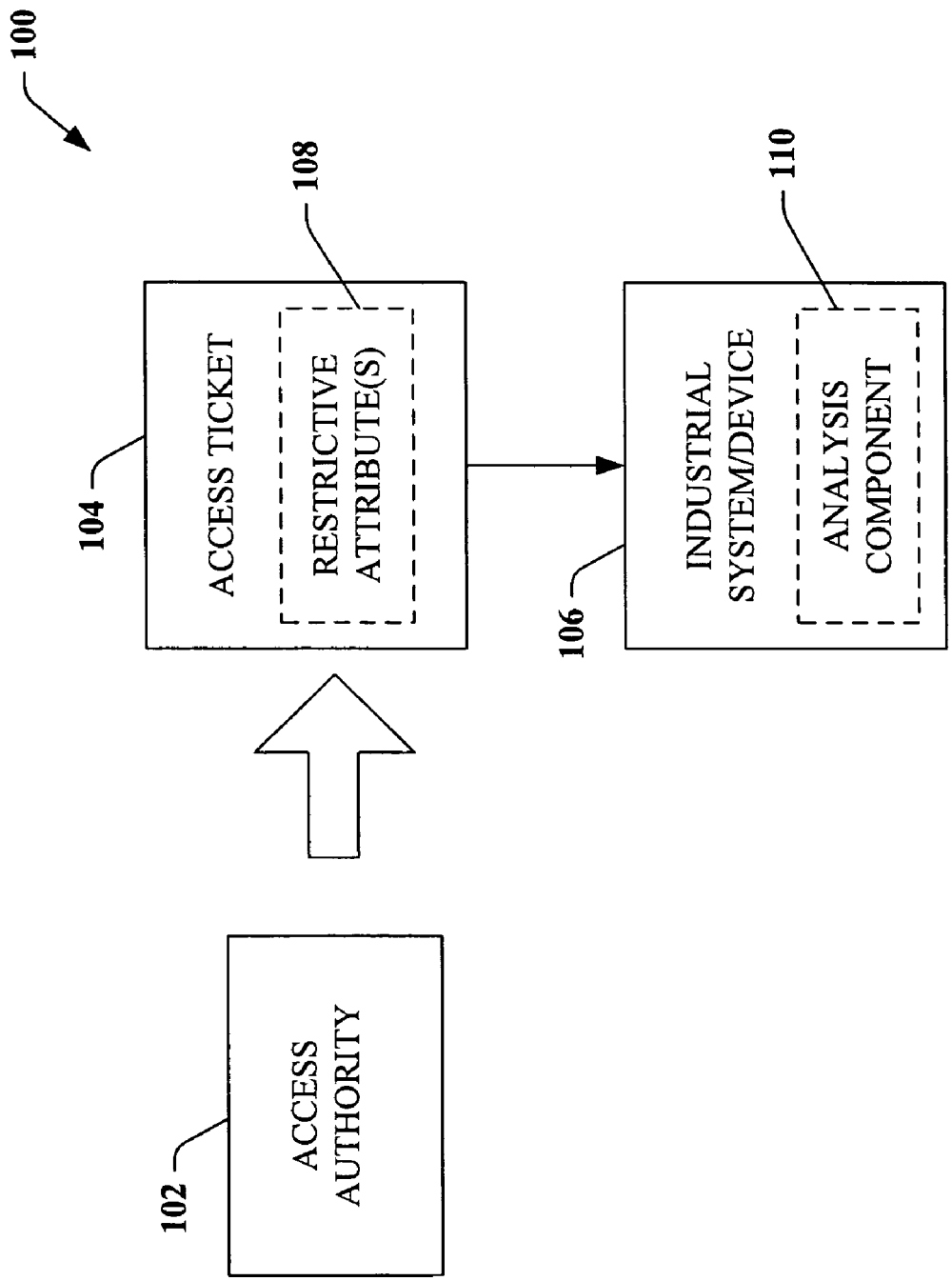
FIG. 1 is a high-level block diagram of a system that facilitates providing granular access restrictions relating to an industrial system/device in accordance with an aspect of the subject invention.

The subject invention is now described with reference to the drawings, wherein like reference numerals are used to refer to like elements throughout. In the following description, for purposes of explanation, numerous specific details are set forth in order to provide a thorough understanding of the subject invention. It may be evident, however, that the subject invention may be practiced without these specific details. In other instances, well-known structures and devices are shown in block diagram form in order to facilitate describing the subject invention.

As used in this application, the terms "component," "handler," "model," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Referring now to the drawings, FIG. 1 illustrates a high-level system overview in connection with an aspect of the subject invention, which relates to a novel system 100 that facilitates enhancing security for systems and/or devices within an industrial automation environment. The system 100 enables restriction of access rights to vendors as well as other users based upon defined user privileges. The system 100 includes an access authority 102 that maintains and administers access rights relating to industrial systems/devices within an industrial automation environment. In particular, the access authority 102 can generate an access ticket 104 that is utilized to obtain access to an industrial system and/or device 106. For instance, a user (not shown) can request access to the industrial system/device 106. Such request can be delivered directly to the industrial system/device 106 and/or delivered first to the access authority 102. Based upon such request and rules associated with parameters of the request, the access authority 102 can create the access ticket 104.

Furthermore, the access ticket 104 can include restrictive attribute(s) 108 that effectively restrict rights of a user to access the industrial system/device 106. In particular, the restrictive attribute(s) 108 can include time-related restrictions, user-related restrictions, action-related privileges (e.g., restrict rights to particular actions), location-related privileges, read/write restrictions for particular portions of code within a system, or any other suitable restrictions that can be employed in an industrial automation context. The access ticket 104 including the restrictive attribute(s) 108 can thereafter be delivered from the access authority 102 to the industrial system/device 106. An analysis component 110 that is associated with the industrial system/device 106 analyzes and authenticates the access ticket 104 and the restrictive attribute(s) 108, and grants a requesting entity access to the industrial system/device 106 based upon the analysis. For one simplistic example, the restrictive attribute(s) 108 can include time limitations, where a requesting entity can access the industrial system/device 106 within a particular timeframe. The analysis component 110 can analyze the timeframe and determine whether the access request falls within such timeframe. If the access request is valid according to the time restriction within the restrictive attribute(s) 108, the analysis component 110 can allow access to the industrial system/device 106. In an instance that the access request is invalid according to the time restriction within the restrictive attribute(s) 108, access to the industrial system/device 106 can be disallowed upon a determination of validity by the analysis component 110.

Furthermore, the analysis component 110 can determine whether the access ticket 104 has been subject to tampering as well as whether the access ticket 104 is from a trusted source (e.g., the access authority 102). The access ticket 104 can be encrypted via any suitable encryption technology. In accordance with one aspect of the subject invention, the system 100 can employ Kerberos in connection with the access ticket 104. Kerberos is a computer network authentication protocol designed for utilization on insecure networks (e.g., the Internet). Kerberos allows user/systems/devices that communicate over a network to prove identity to each other while further preventing eavesdropping or replay attacks, and provides for detection of modification as well as prevents unauthorized reading. Thus, the access authority 102 and the industrial system/device 106 can prove identity to each other via the access ticket 104 and other communications. Moreover, Pretty-Good-Privacy (PGP) can also be employed in connection with delivering the access ticket 104 from the access authority 102 to the industrial system/device 106. PGP is a program that provides cryptographic privacy and authentication. Thus, utilizing PGP, a distributed web of trust can be built between devices an industrial automation environment, as well as between the access control authority 102 and the industrial system/device 106. While the above illustrates particular certificate and/or networking protocols, it is to be understood that any suitable configuration and transfer of the access ticket 104 between the access authority 102 and the industrial system/device 106 is contemplated by the inventors of the subject invention, and intended to fall under the scope of the hereto-appended claims.

As stated above, an access request can be received by the industrial system/device 106 and/or the access authority 102. If the industrial system/device 106 initially receives the access request (either remotely or on-site), the industrial system/device 106 can challenge the requester for authentication information. For example, the authentication information can include a username, a password, a personal identification number (PIN), and the like. Thus, if the request is made on-site, the industrial system/device 106 can be associated with an interface, such as a keypad, to enable the requester to enter identification information. If the industrial system/device 106 is accessible to users via a network (e.g., the Internet, an intranet, . . . ), the access request and the identification information can be initiated from a remote computer, and can be entered through standard computer interfaces (e.g., mouse, display, keyboard, . . . ). If the industrial system/device 106 includes sufficient intelligence (e.g., processing and storage capabilities), then the requester can be authenticated directly by the industrial system/device 106. In a disparate aspect of the subject invention, the industrial system/device 106 can forward the request and requester authentication information to the access authority 102, which can thereafter determine whether the requester is an authorized user of the industrial system/device 106. Further, the industrial system/device 106 can relay system/device information to the access authority 102, such as system/device identifying indicia (e.g., system/device number, location, task, . . . ). Upon receiving such information, the access authority 102 can generate the access ticket 104 and incorporate restrictive attribute(s) 108 according to the requester and the industrial system/device 106. For instance, if the user is a vendor and only requires one-time access to the industrial system/device 106 for maintenance, the access authority 102 can render the access ticket 104 valid for a single use. Thus, if there is an attempt to employ the access ticket 104 at a later time, the access ticket 104 will be invalid (e.g., the industrial system/device 106 can alter the access ticket 104 to render it invalid after access has been granted).

Benefits of delivering an access request to the industrial system/device 106 include automatically delivering identifying indicia relating to the industrial system/device 106 upon a request for access. This reduces a probability for accessing an incorrect device by mistake. For instance, the industrial system/device 106, which can require repair, can be substantially similar to a disparate system/device within an industrial automation environment. A requester can mistakenly request access to the disparate system/device, incorrectly believing that the disparate system/device requires maintenance when in actuality the industrial system/device 106 requires maintenance. If the request is delivered to the disparate system/device, the system/device will correspond with the access authority 102 and relay identifying indicia relating thereto. The access authority 102 can have access to maintenance records, and determine that the disparate system/device is not in need of maintenance, and thus prevent the requester from accessing such device.

In accordance with a disparate aspect of the subject invention, the request for access to the industrial system/device 106 can be initially received by the access authority 102. In such case, the requester can sufficiently identify the industrial system/device 106 to which access is desired. Thereafter the access authority 102 can obtain authentication information (e.g., identity information) from the requester to ensure that such requester is authorized to access the industrial system/device 106. Upon authentication and determining access restrictions that should be associated with the access request and the requester, the access authority 102 can generate the access ticket 104 including the restrictive attribute(s) 108. The access ticket 104 can thereafter be delivered to the industrial system/device 106 to which access is allowed. The analysis component 110 thereafter analyzes the restrictive attribute(s) 108 and determines whether access should be granted to the requester as well as extent of access according to the restrictive attribute(s) 108.

The system 100 provides several benefits over conventional security systems. For example, unlimited access to a requester (e.g., a vendor) is not required to be granted in order to enable the requester to complete a task. For instance, a one-time access pass can be created by the access authority 102, wherein such access is to occur within a particular timeframe. If the access does not occur within a time specified within the restrictive attribute(s), access is denied to the requester. Further, the access authority can control access to the industrial system/device 106 by restricting access depending upon location of a requester relative to the industrial system/device 106, task desirably performed upon the system/device 106, and any other suitable restrictions that can be included within the restrictive attribute(s) 108.

In accordance with another aspect of the subject invention, the access ticket 104 created by the access authority 102 can be encrypted in a manner to allow only the industrial system/device 106 to which access is desired to decrypt the access ticket 104. In particular, the access ticket 104 can include cryptographic keys. For one particular example, user keys can be generated and included within the access ticket 104 together with the restrictive attribute(s) 108. Thereafter, such keys and restrictive attribute(s) 108 can be hashed by employing a cryptography hashing function, such as MD5, SHA-1, RIPEMD-160, or any other suitable hashing function. The hash can thereafter be signed through utilization of one or more private key(s) associated with the access authority 102. A session key can also be encrypted within the access ticket 104. The encrypted access ticket 104, including private keys, session keys, and a signature from the access authority 102 can then be parsed by the industrial system/device 106, which can decrypt the session key. The industrial system/device 106 will know of the corresponding hashing function, and can thus decrypt the access ticket 104 and restrictive attribute(s) 108 and apply them therein. Such security may be imperative in view of hackers that can attempt to intercept networked communications and modify such communications to enable uninhibited access to the industrial system/device 106. Thus, the access ticket 104 will be indecipherable to a hacker who intercepts the ticket 104 prior to the access ticket 104 reaching the industrial system/device 106. While the above illustrates one method of providing cryptographic security relating to the access ticket 104, any suitable manner of encrypting and decrypting the access ticket 104 securely is contemplated by the inventors of the subject invention and intended to fall under the scope of the hereto-appended claims.

Figure 2:
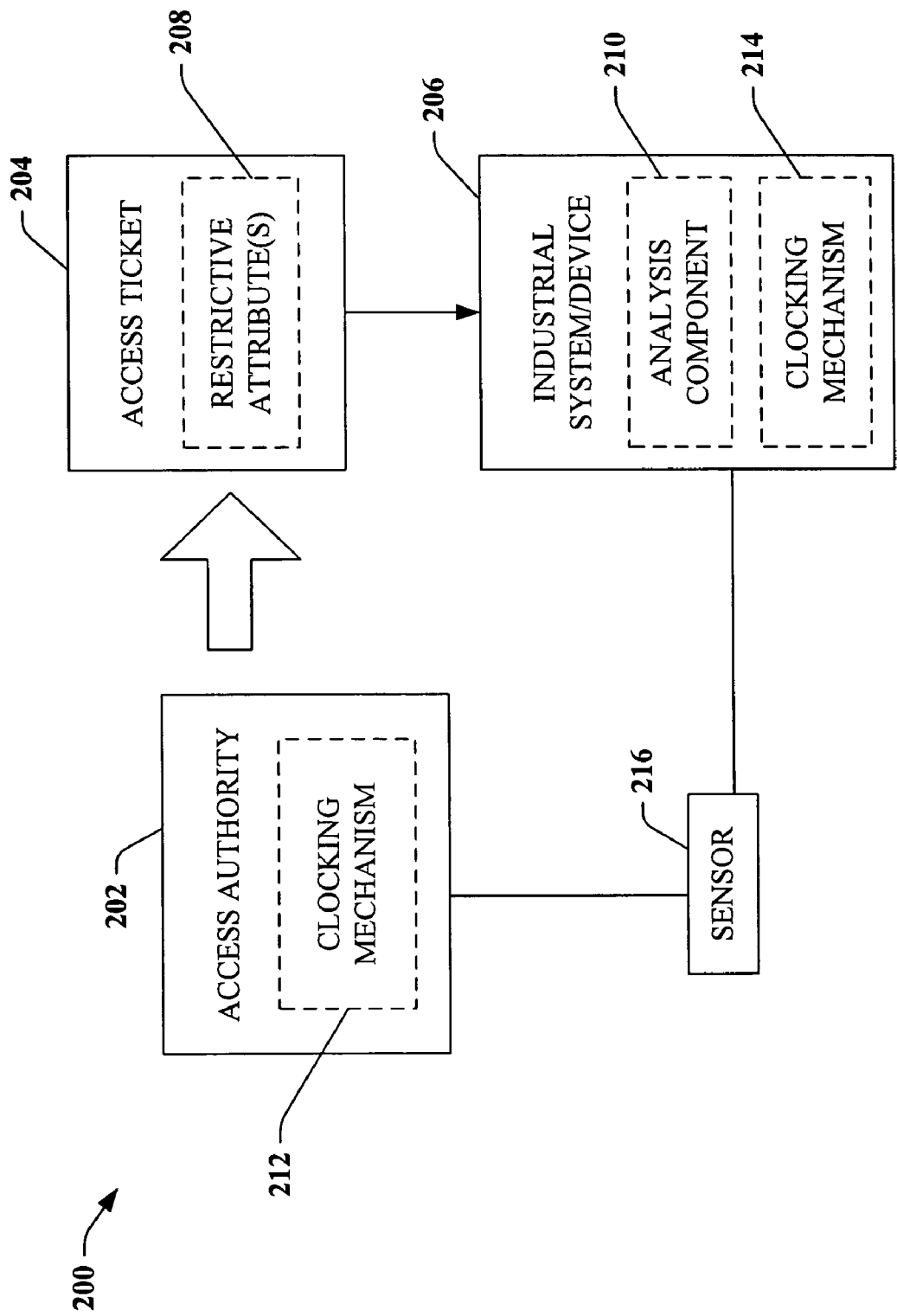
FIG. 2 is a block diagram of a system that facilitates prohibiting a valid access ticket from expiring in a disconnected industrial system/device in accordance with an aspect of the subject invention.

Now referring to FIG. 2, a system 200 that facilitates rendering industrial automation security more efficient with respect to one or more disconnected systems/devices is illustrated. The system 200 includes an access authority 202 that administers and maintains access rights relating to systems/devices within an industrial automation environment. In particular, the access authority 202 generates an access ticket 204 that is employed to grant access to an industrial system/device 206 within the industrial automation environment. The access ticket 204 is associated with restrictive attribute(s) 208 that effectively restrict access rights of a requester (not shown) to the industrial system/device 206. For instance, access can be restricted based upon a timeframe restriction, task, relative location between the requester and the industrial system/device 206, etc. Furthermore, the restrictive attribute(s) 208 can include information that renders the access ticket 204 valid for a single access.

The industrial system/device 206 receives the access ticket 204 and utilizes an analysis component 210 to analyze the access ticket 204 and associated restrictive attribute(s) 208. For example, the analysis component 210 determines whether the restrictive attribute(s) 208 have and/or will be violated prior to allowing access to the industrial system/device 206. Specifically, the analysis component 210 can determine whether the request is within a timeframe specified within the restrictive attribute(s) 208. Further, the analysis component 210 can determine that the access ticket 204 is to be utilized for a single access only, and can review the access ticket 204 to ascertain whether such access ticket 204 has previously been employed. If it has been previously employed, then access can be denied.

The access authority 202 further includes a clocking mechanism 212, thereby allowing the access ticket 204 to be associated with a timestamp and/or other time-related information. For one particular example, the clocking mechanism 212 can be employed to provide the access ticket 204 with an expiration time that is included within the restrictive attribute(s) 208. The industrial system/device 206 can likewise include a clocking mechanism 214 to facilitate determining whether the access ticket 204 has been presented to the industrial system/device 206 within a timeframe defined in the restrictive attribute(s) 208. Thus, for example, the clocking mechanism 212 and the clocking mechanism 214 can be synchronized when the industrial system/device 206 is communicatively connected to the access authority 202.

A sensor 216 can determine whether the access authority 202 and the industrial system/device 206 are communicatively connected. Upon disconnection, the industrial system/device 206 can effectively pause the clocking mechanism 214. Such pausing creates a virtual clock with respect to the industrial system/device 206, wherein an expiration time defined within the restrictive attribute(s) 208 is compared to the virtual time rather than real time. An example may assist in illustrating benefits of employing a virtual clock within the system 200. The access authority 202 is communicatively connected to the industrial system/device 206, and the clocking mechanisms 212 and 214 are synchronized. The access authority generates the access ticket 204, which includes an expiration time within the restrictive attribute(s) 208, and passes such access ticket to the industrial system/device 206. Thereafter, the sensor 216 determines that the access authority 202 and the industrial system/device 206 have become disconnected. Conventional systems do not modify operation of the clocking mechanism 214, which continues to operate approximately synchronous to the clocking mechanism 212 of the access authority 202. No difficulties arise if the access authority 202 and the industrial system/device 206 become reconnected prior to expiration of the access timeframe within the restrictive attribute(s) 208, as the ticket can be renewed. If, however, the access authority 202 and the industrial system/device remain disconnected for an extensive period of time, the access ticket 204 can expire and may not be renewed. This can become a common issue, as network infrastructure and control system requirements can necessitate a control system and/or device to operate disconnected for a substantial period of time.

The system 200 mitigates the aforementioned difficulties via pausing the clocking mechanism 214 upon sensing that the access authority 202 has become disconnected from the industrial system/device 206. Therefore, the access ticket 204 will not expire while such disconnection exists. For instance, the clocking mechanisms 212 and 214 of the access authority 202 and industrial system/device 206, respectively, can be synchronized, and the access authority 202 can issue the access ticket 204 at a time X that is to expire at a time Y. After time X but prior to time Y, the sensor 216 senses that the industrial system/device 206 and the access authority 202 have become disconnected, thus pausing the clocking mechanism 214 of the industrial system/device 206 prior to time Y. The clocking mechanism 212 continues to operate normally, surpassing time Y; however, the access ticket 204 will not expire as the clocking mechanism 214 of the industrial system/device 206 has paused at a time prior to the expiration time Y. Therefore, a valid access ticket within a disconnected system/device will not expire during a disconnection of the access authority 202 and the industrial system/device 206. Upon reconnection, the clocking mechanism 214 can be synchronized with the clocking mechanism 212 of the access authority 202. In accordance with a disparate aspect of the subject invention, the clocking mechanism 214 can simply be restarted (rather than reset or synchronized with the clocking mechanism 212 of the access authority 202).

In accordance with yet another aspect of the subject invention, the clocking mechanism 214 associated with the industrial system/device 206 can be employed to limit a time of access that a user has to the industrial system/device 206. In particular, rather than creating an end time of access (e.g., 4:00 p.m. EST) within the access ticket 204, the access authority 202 and the clocking mechanism 212 can create a total time of access as a restriction (e.g., eight hours). Upon receiving the access ticket 204, the industrial system/device 206 can utilize the clocking mechanism 214 to start a timer that corresponds to the total time of access restriction. Thus, a "count down" approach can be utilized. Therefore, even if the industrial system/device 206 becomes disconnected from the access authority 202, the access timeframe can still be enforced. This aspect of the invention prohibits a malicious user from disconnecting the industrial system/device 206 from a network simply to prevent a time of access. This aspect of the subject invention provides several improvements over conventional automation security systems. For instance, even though the access authority 202 issues the access ticket 204, the industrial system/device 206 can enforce time-requirements associated with the access ticket 204 by employing the clocking mechanism 214 to "count down" a time of access (in contrast to comparing times, which can be subject to hacking, improperly set time, and the like). Whether the clocking mechanism 214 pauses or continues to count-down can be selectable by a company, and can depend upon security procedures and/or concerns. Furthermore, aspects of the subject invention can be customized for particular devices and/or contexts.

Figure 3:
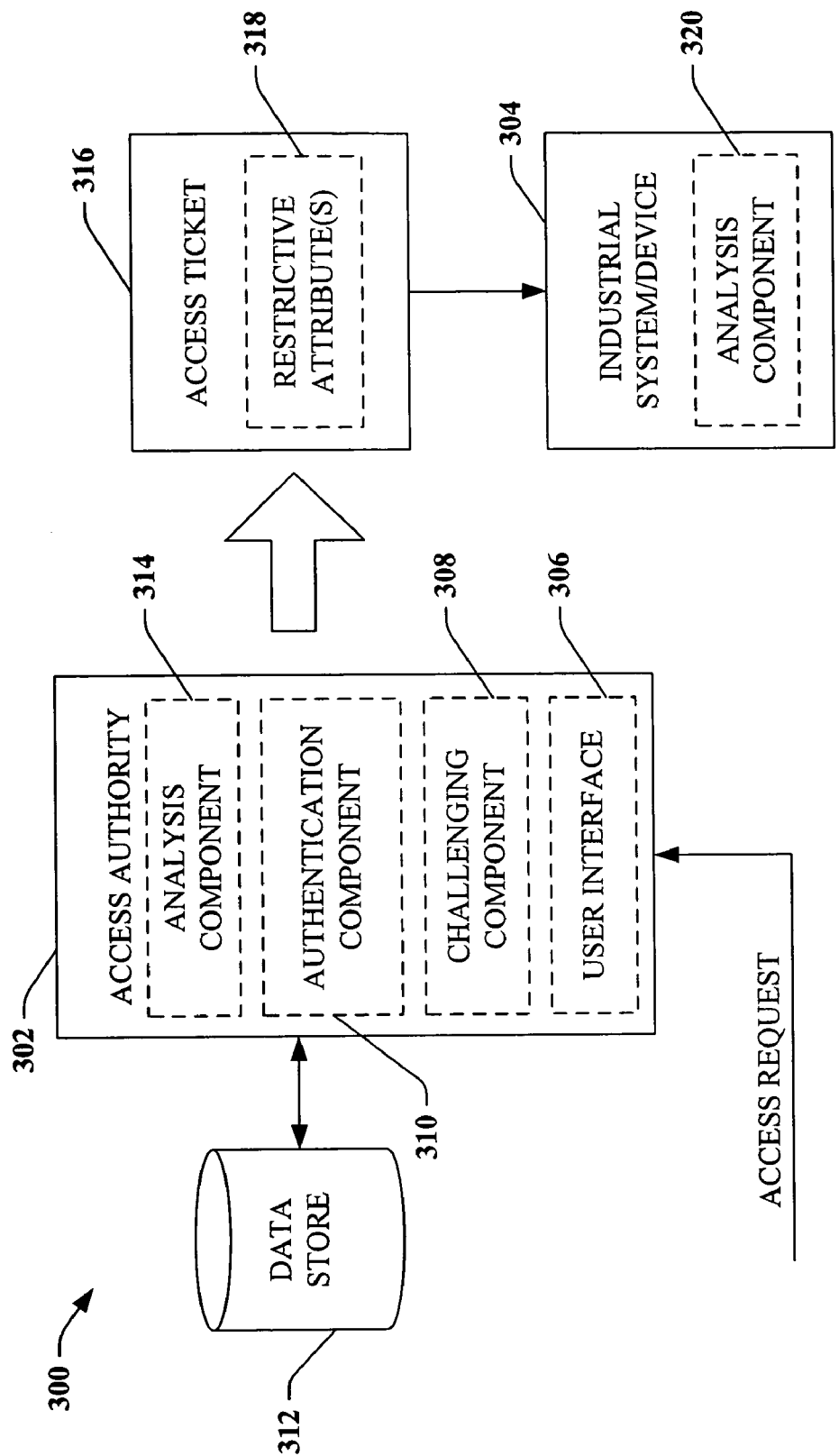
FIG. 3 is a block diagram of a system that facilitates providing restrictive access rights to an industrial system/device based at least in part upon an access request and requester identity in accordance with an aspect of the subject invention.

Referring now to FIG. 3, a system 300 that facilitates enhancing security in an industrial automation environment is illustrated. The system 300 includes an access authority 302 that receives an access request relating to an industrial system/device 304. For instance, the industrial system/device 304 can include a programmable logic controller (PLC) as well as control logic therein. Thus, if a vendor and/or technician desire access to the control logic, they can obtain such access through the access authority 302. In accordance with one aspect of the subject invention, the access authority 302 can be associated with a user interface 306. For instance, the user interface 306 can be a keyboard, display, or any other suitable interface. Further, while illustrated as being included within the access authority 302, the user interface 306 can be related to a remote machine (e.g., the access request can be communicated to the access authority 302 via the user interface 306 that is associated with a remote machine, such as a personal computer). The access request can identify a requester, the industrial system/device 304 desirably accessed, tasks to be undertaken if access is granted, and any other suitable parameters relating to the access request.

Upon receiving the access request, a challenging component 308 within the access authority 302 can request authenticating information from the requester. For instance, if the requester is a computing component, the challenging component 308 can request various indicia, such as purpose of the component, component identity, and the like from such component. If the requester is a human, the challenging component 308 can request a username, password, PIN, biometric information (e.g., fingerprint, voice identification, retina scan, facial feature identification, . . . ), and the like. Upon challenging the requester for authenticating information, an authentication component 310 determines whether the authenticating information is valid. For instance, valid requester information can be retained in a data store 312, and the authentication component can compare such retained information with the authenticating information provided by the requester.

If the information provided by the requester is valid, an analysis component 314 can analyze the access request. For instance, the analysis component 314 can obtain information from the data store 312 relating to the requesters access rights, past access requests, and other suitable information that can assist in analyzing the access request. Particularly, the data store 312 can include access rules and privileges relating to requesters and devices/systems within an industrial automation environment. The analysis component 314 can apply the rules within the data store 312 to the access request. Thereafter, the access authority 302 generates an access ticket that includes restrictive attribute(s) 318 according to the rules within the data store 312 and the access request. For instance, the restrictive attribute(s) 318 can include time-restrictions for access, single-access restrictions, restrictions of tasks and/or portions of the industrial system/device 304 that can be accessed, etc. The access ticket 316 can be provided to the industrial system/device 304, and analyzed by an analysis component 320. The analysis component 320 can ascertain access rights/restrictions associated with the access ticket 316, and provide mechanisms to enforce such rights/restrictions (e.g., alarms).

Figure 4:
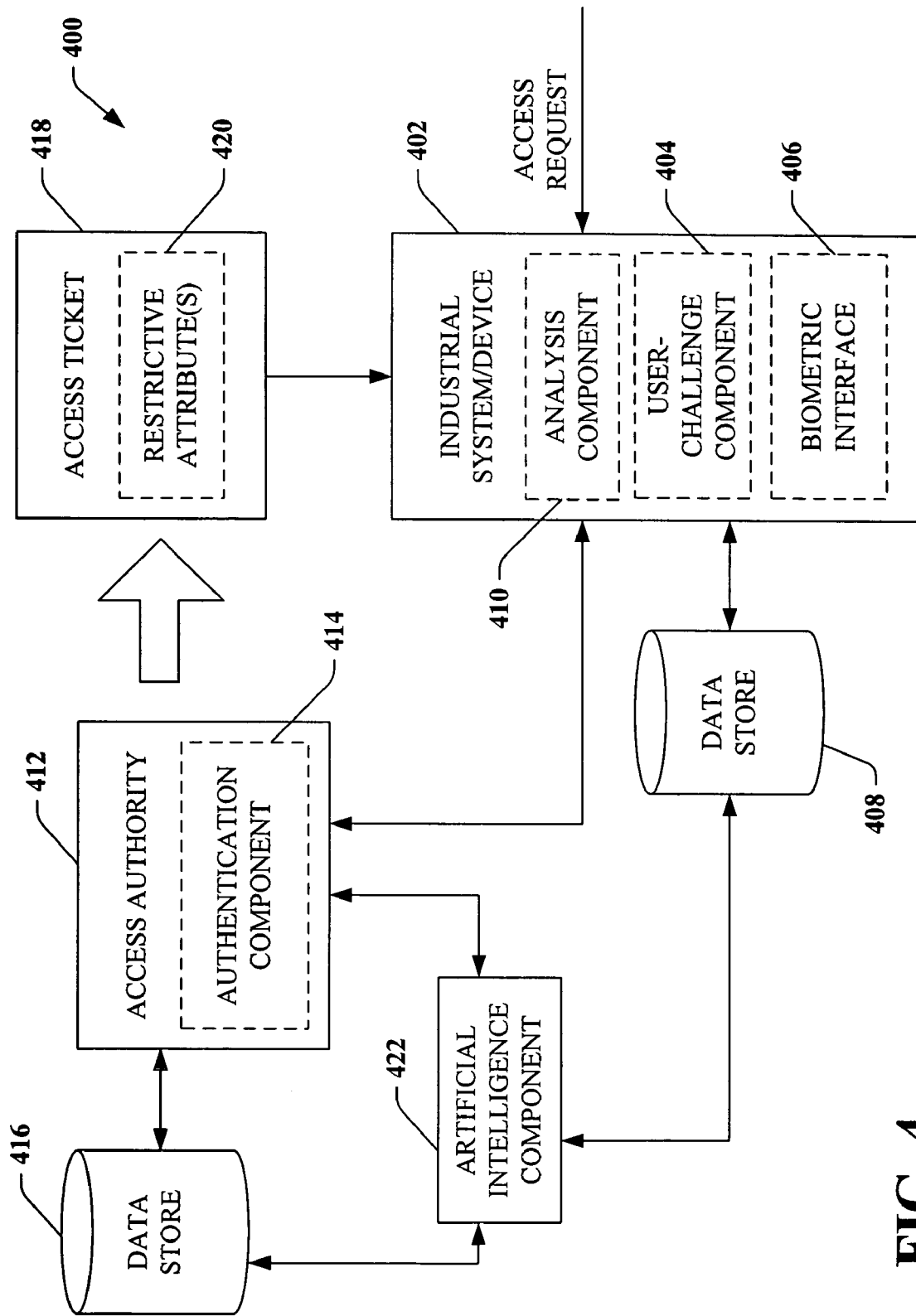
FIG. 4 is block diagram of a system that facilitates generating restrictive access rights in relation to an industrial system/device in accordance with an aspect of the subject invention.

Turning now to FIG. 4, a system 400 that facilitates securing systems/devices within an industrial environment is illustrated. The system 400 includes an industrial system/device 402 that receives an access request. For instance, a vendor can be physically proximate to the industrial system/device 402, and enter a request through an access port, a user interface such as a keyboard, mouse, pressure sensitive screen or the like, and any other suitable manner to deliver an access request to the industrial system/device 402. For another example, the access request can be received from a remote location through a trusted network (e.g., a personal computer can be employed to generate an access request). Upon receiving the access request, the industrial system/device 402 employs a user-challenge component 404 to challenge the requester to provide authenticating information. The authenticating information can include usernames, passwords, and the like. In accordance with another aspect of the present invention, the user-challenge component 404 can prompt the requester to enter authenticating information via a biometric interface 406. The biometric interface 406 can, for example, capture fingerprint information, capture a voice sample, capture a photograph of a requesters face, or other similar biometric attributes. In accordance with one aspect of the present invention, the industrial system/device 402 is associated with sufficient processing and/or memory to validate the requester authentication information. For example, a data store 408 can include authenticating indicia for requesters authorized to access the industrial system/device 402. An analysis component 410 can compare the authenticating information within the data store 408 to authenticating information provided by the requester, and determine whether such requester is providing valid access information. The data store 408 can further collect and retain audit information, such as identities of individuals who have accessed the industrial system/device 402, times of access, tasks undertaken during access, duration of access, and the like.

In accordance with a disparate aspect of the subject invention, authentication information provided by the requester upon being prompted by the user-challenge component 404 can be directed to an access authority 412 that is employed to administer and maintain access privileges for an industrial automation environment. The access authority 412 can include an authentication component 414 that reviews the provided requester authentication information and determines whether such requester is authorized to access the industrial system/device 402. For instance, a data store 416 can include requesters that are authorized to access the industrial system/device 402 as well as usernames, passwords, PINs, biometric information, etc. associated with such requesters. Thus, the access authority 412 can determine whether the requester is authorized to access the industrial system/device 402.

The access authority 412 generates an access ticket 418 that is utilized to grant the requester access to the industrial system/device 402. For instance, the access ticket 418 can be delivered from the access authority 412 to the industrial system/device 402 over a trusted network, and any suitable security protocols (e.g., PGP, Kerberos, . . . ) can be employed in connection with such transfer. The access ticket 418 can include restrictive attribute(s) 420 that restrict the requester's access rights to the industrial system 402. For a particular example, the restrictive attribute(s) 420 can include a single-use restriction (e.g., the access ticket 418 is only valid for a single user—a subsequent attempt to utilize the access ticket 418 will be prohibited). Such single use can be enforced by modification of the access ticket 418 upon receipt by the industrial system/device 402, destruction of the access ticket 418 upon receipt by the industrial system/device 402, and other suitable methods of ensuring that the access ticket 418 is only valid for a single use.

The system 400 can further include an artificial intelligence component 422 that can watch the industrial system/device 402 and/or the access authority 412 over time and learn desirable actions of the system 400 given particular requesters and access requests. Particularly, the artificial intelligence component 422 can assist the access authority 412 in generating the access ticket 418 and restrictive attribute(s) 420 by making inferences relating to access privileges given a particular requester and context relating thereto. As used herein, the terms to "infer" or "inference" refer generally to the process of reasoning about or inferring states of a system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

For one particular example, a technician can have access rights to several systems/devices within an industrial automation environment. Over time, the artificial intelligence component 422 can watch the technician and learn precisely which portions of a system/device the technician can access. For instance, the technician may, over a period of time, only view a control program relating to the industrial system/device 402 on particular days and/or at particular times. Further, times of the technician's access to devices can be monitored by the artificial intelligence component, and access can be automatically allowed for certain devices based upon such monitoring. Thereafter, the artificial intelligence component 422 can assist in generating the restrictive attribute(s) for the user given particular times. For example, the technician over time may only access devices on a certain shift. Thus, if the technician requests access at a disparate shift, the artificial intelligence component 422 can request further authentication information prior to allowing access, as a username and/or password may have been compromised. For instance, the artificial intelligence component 422 can inform the access authority 412 to request biometric data to ensure that the proffered identification information is provided by the technician and not a hacker or thief of the identification information. The data stores 408 and 416 can retain audit information relating to the access authority 412 and the industrial system/device 402, and such information can be reviewed and analyzed by the artificial intelligence component 422 in connection with making inferences relating to security of the system 400. The data stores 408 and 416 can likewise retain inferences made by the artificial intelligence component 422.

Figure 5:
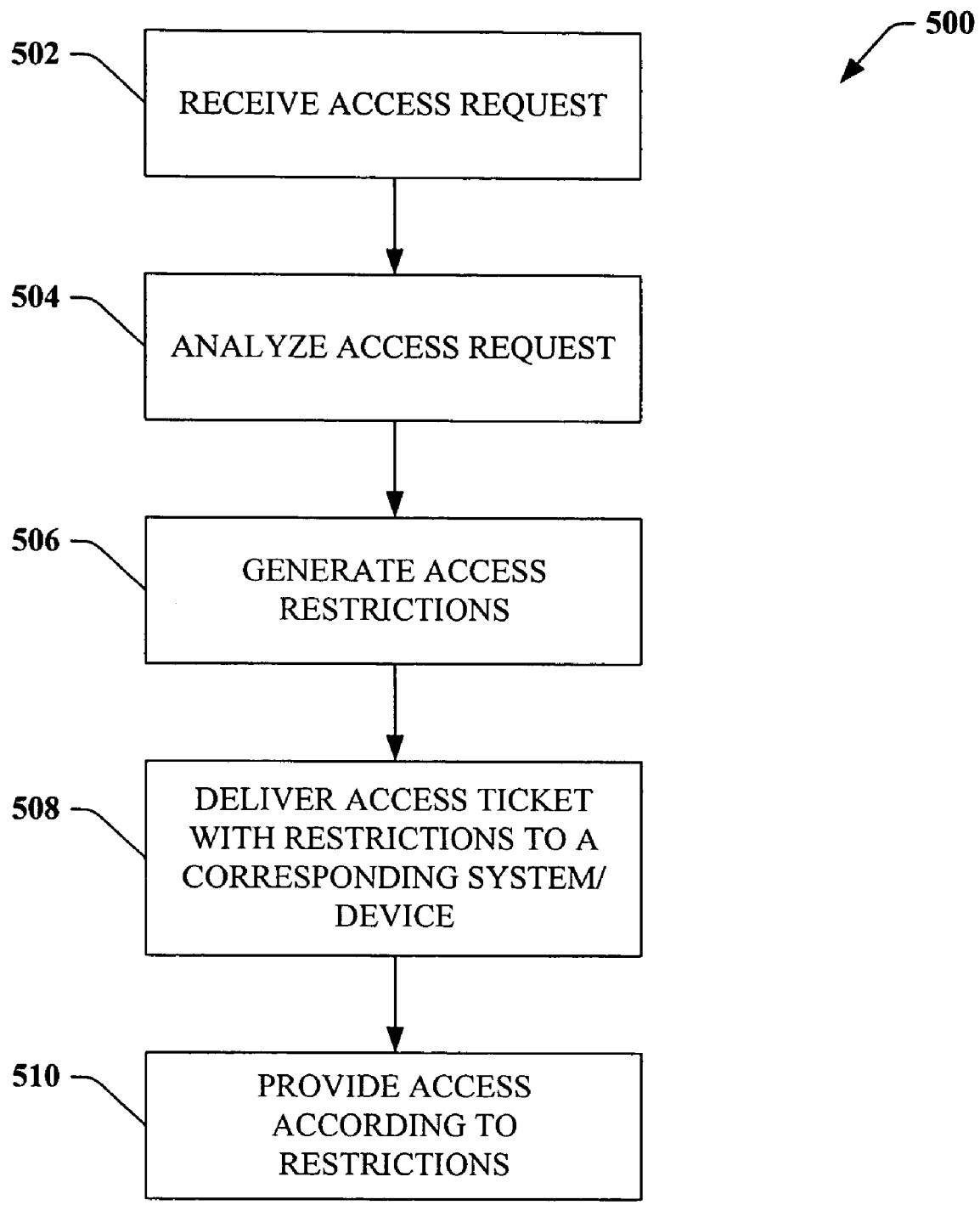
FIG. 5 is a representative flow diagram illustrating a methodology for providing restrictive access rights to an industrial system/device in accordance with an aspect of the subject invention.

Turning now to FIG. 5, a methodology 500 for providing granular security with respect to one or more industrial systems/devices is illustrated. While, for purposes of simplicity of explanation, the methodology 500 is shown and described as a series of acts, it is to be understood and appreciated that the subject invention is not limited by the order of acts, as some acts may, in accordance with the subject invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject invention.

At 502, an access request is received. An access authority can receive the access request initially, or in a disparate embodiment, an industrial system/device to which access is desired can receive the access request. For example, the access request can simply be in the form of attempting to log-on to an industrial system/device utilizing conventional username(s) and password(s). At 504, the access request is analyzed. The analysis can include determining access privileges for disparate devices within an industrial automation environment. In accordance with one aspect of the subject invention, an access authority can analyze a requester as well as the request and determine access privileges the user is associated with. At 506, access restrictions are generated based upon the analysis. These access restrictions can be more granular access restrictions than allowed by conventional security systems. For example, conventional security systems for systems/devices within an industrial automation environment simply employ usernames and passwords to obtain complete access to the system/device. This is often not desirable in a factory automation environment. For instance, all or portions of a secret recipe for a product (e.g., a cola) can be contained within a controller. While certain portions of the controller should be subject to maintenance and debugging by a technician, conventional security systems allow access to an entirety of the controller, thereby compromising the secret recipe. The subject invention enables more detailed access restrictions to be provided to an industrial system/device. Thus, in accordance with the above example, a technician would be provided access only with portions of the controller that are desirably debugged and/or maintained. Further, the generated access restrictions can label certain portions of control logic within a PLC as read-only, other portions can't be read at all, and still other portions can be labeled as read-write within the generated access restrictions.

At 508, the access ticket is delivered with restrictions to a system/device to which access is desired. The access ticket can be delivered over a secure network, and can be encrypted in such a manner that only the device that receives the ticket can have an ability to analyze the access ticket. For instance, the access ticket can be commissioned with encrypted keys, wherein knowledge of such keys is required to decrypt the access ticket. Thus, even if the access key were intercepted, it could not be read and/or modified by a malicious third party. At 510, access to the industrial system/device is provided according to the access restrictions. For instance, if the access restrictions associated with the access ticket included a restriction relating to a certain timeframe of access and/or particular tasks, the industrial system/device enforces such restrictions. Further, if the access ticket is restricted based upon time, the system/device will only allow access therein within such restricted timeframe. In another example, the access ticket can be associated with a single-use restriction. If the access ticket is provided subsequently to a first use, the system/device will not accept such access ticket.

Figure 6:
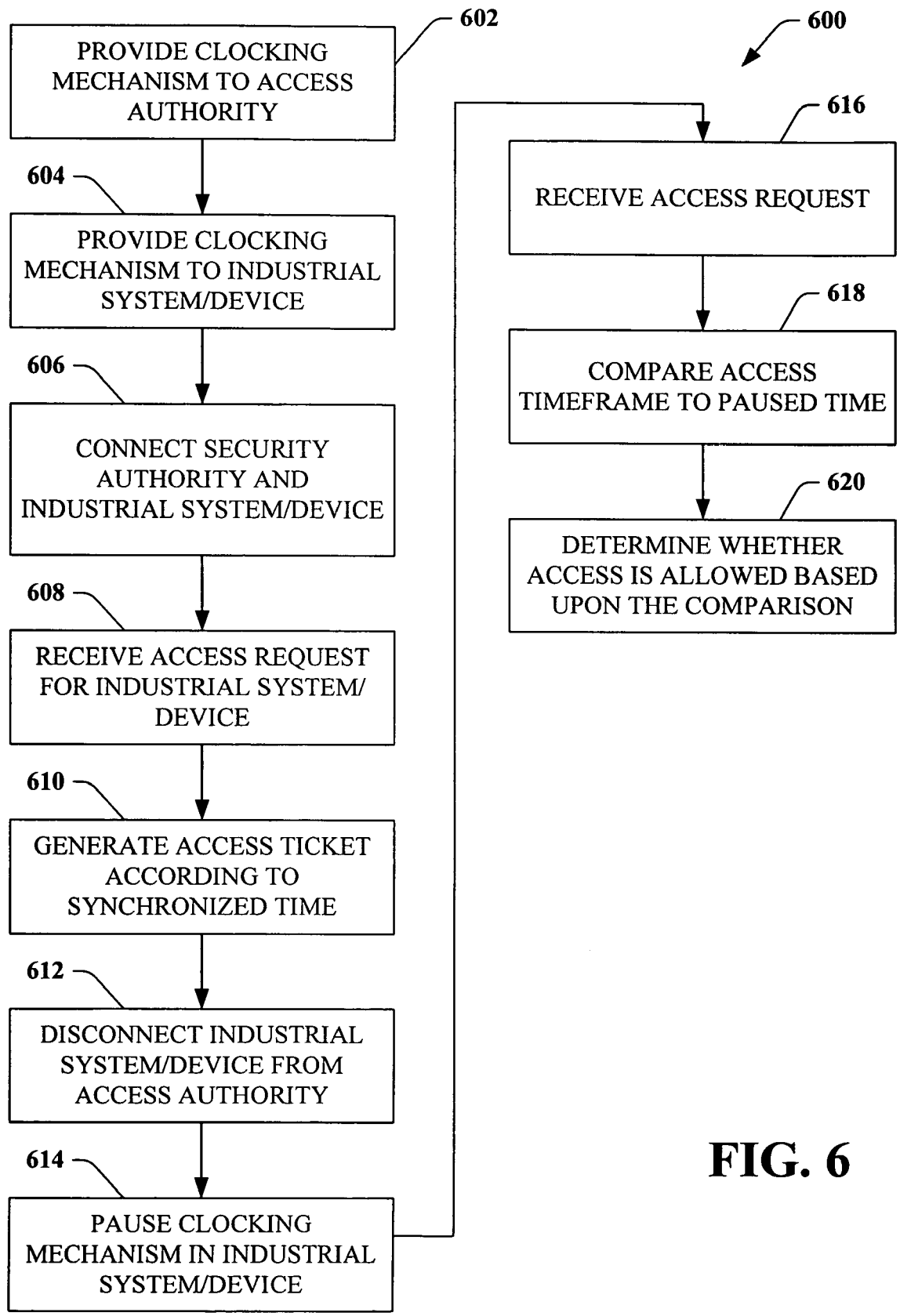
FIG. 6 is a representative flow diagram illustrating a methodology for preventing a valid access ticket from expiring in a disconnected industrial system/device in accordance with an aspect of the subject invention.

Referring now to FIG. 6, a methodology 600 for providing access to an industrial system/device that becomes disconnected from an access authority is illustrated. At 602, a clocking mechanism is provided to an access authority. For example, the clocking mechanism can be a real-time clock, thus easily enabling synchronization with other clocking mechanisms. At 604, a clocking mechanism is provided to the industrial system/device. Again, such clocking mechanism can be a real-time clock, thereby enabling synchronization of such clocking mechanism with the clocking mechanism of the access authority. In a disparate embodiment, the clocking mechanism can be a relative time-base that is readily available and inexpensive. Such relative time-base clocking mechanism can also be synchronized with the clocking mechanism of the access authority.

At 606, the access authority and the industrial system/device are connected, thereby enabling the clocking mechanisms of such access authority and the industrial system/device to be synchronized. Further, access tickets can be passed directly from the access authority to the industrial system/device. At 608, an access request relating to the industrial system/device is received. For example, the access request can be received at the industrial system/device through a user interface, and can be initiated by attempting to enter identification information (e.g., username, password, PIN, biometric information, . . . ). At 610, an access ticket can be generated by the access authority according to the synchronized time. In particular, the access ticket can be associated with an expiration time, wherein the ticket is valid until such expiration time. For instance, the access ticket can be provided to the industrial system/device, and cached in memory for the allocated timeframe. Thereafter, if a user associated with the ticket requests access to the device, the access ticket can be employed to provide the user with access according to assigned restrictive attribute(s). If the access ticket expires with reference to the clocking mechanism of the industrial system/device, then a user associated with such ticket can be denied access until such ticket is renewed.

At 612, a disconnection between the industrial system/device and the access authority is sensed. For instance, a sensor can be employed to ping both the industrial system/device and the access sensor, and if one or both of the devices do not respond to such ping, then it can be ascertained that the devices have been disconnected. It is to be understood, however, that any suitable sensing mechanism to determine that a disconnection exists is contemplated by the present invention. At 614, upon sensing the disconnection, the clocking mechanism in the industrial system/device is paused. Such pausing ensures that access tickets that have yet to expire will not expire while the industrial system/device is disconnected from the access authority.

At 616, an access request is received while the industrial system/device is disconnected from the access authority. At 618, the expiration time within the access ticket cached in memory at the industrial system/device is compared to the paused time utilized by the clocking mechanism. At 620, a determination is made regarding whether access is allowed to the user based upon such comparison. In particular, if the paused clocking mechanism in the industrial system/device is at a time prior to the access ticket is set to expire, the access ticket is valid and the user will be granted access to the industrial system/device. If the access ticket expired prior to the access authority and the industrial system/device becoming disconnected, the access ticket is invalid. Upon being reconnected with the access authority, the clocking mechanism in the industrial system/device can be re-started and/or synchronized with the clocking mechanism within the access authority.

Figure 7:
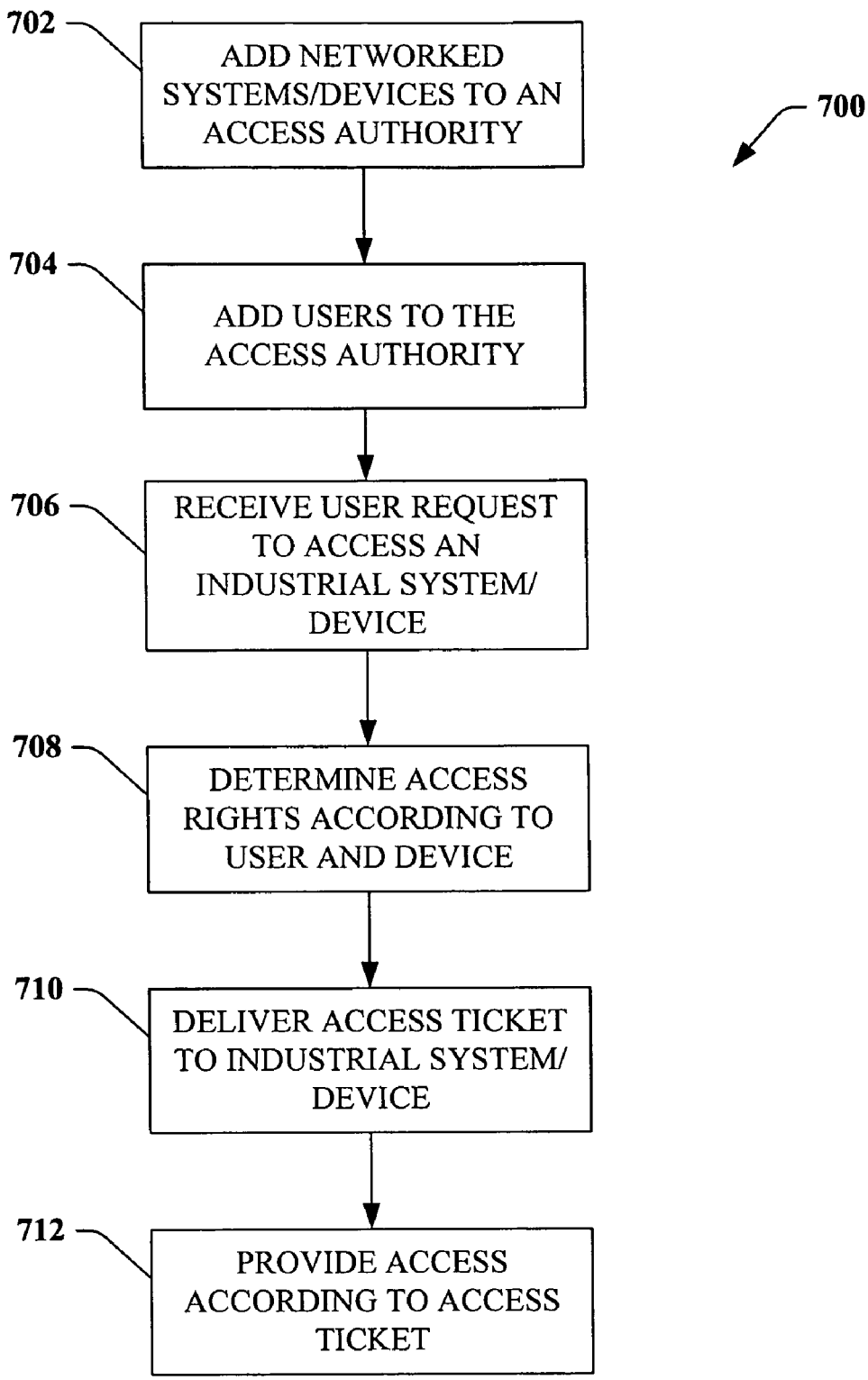
FIG. 7 is a representative flow diagram illustrating a methodology for analyzing user access rights based upon an access ticket that includes restrictive attributes in accordance with an aspect of the subject invention.

Now turning to FIG. 7, a methodology 700 for adding requesting entities and providing restricted access to one or more industrial systems/devices is illustrated. At 702, networked devices are added to an access authority. For instance, industrial systems/devices that are desirably associated with restricted access privileges can be added to an access authority network. Moreover, industrial systems/devices desirably intercommunicate with one another can also be added to the access authority network. At 704, users that are desirably associated with access rights to the industrial systems/devices on the access authority are added to such access authority. Further, access privileges relating to users and devices can be created and added to the access authority. Thus, particular users can be associated with particular access privileges with respect to specific devices. Such granular determination of access rights with respect to particular devices is a vast improvement over conventional security systems, which allowed complete access to disparate devices is a user had access to a username, password, or the like.

At 706, a request is received to access an industrial system/device. The access request can be received at the industrial system/device through a user interface, and can be initiated by providing identifying indicia (e.g., username and password). At 708, access rights are determined according to the user and the device to which access is requested. For instance, the access authority can be associated with rules that can be employed in connection with providing a user with restricted access to the device. At 710, an access ticket that includes access privileges and restrictions with respect to the user and device is delivered to the industrial system/device. Such ticket can be delivered over a wireline and/or wireless network, and can be encrypted to ensure security of such ticket. Particularly, the industrial system/device can be associated with keys that enable comprehension of the access ticket, wherein such keys are solely associated with such industrial system/device. Thus, if the access ticket were intercepted, it cannot be employed on a disparate system/device. At 712, access is provided according to restrictions and/or access privileges within the access ticket. The methodology 700 is a vast improvement over conventional security systems employed in industrial automation environments, as the methodology enables granular security restrictions to be effectuated within such environment, in comparison to granting unhindered access upon knowledge of usernames and/or passwords.

Figure 8:
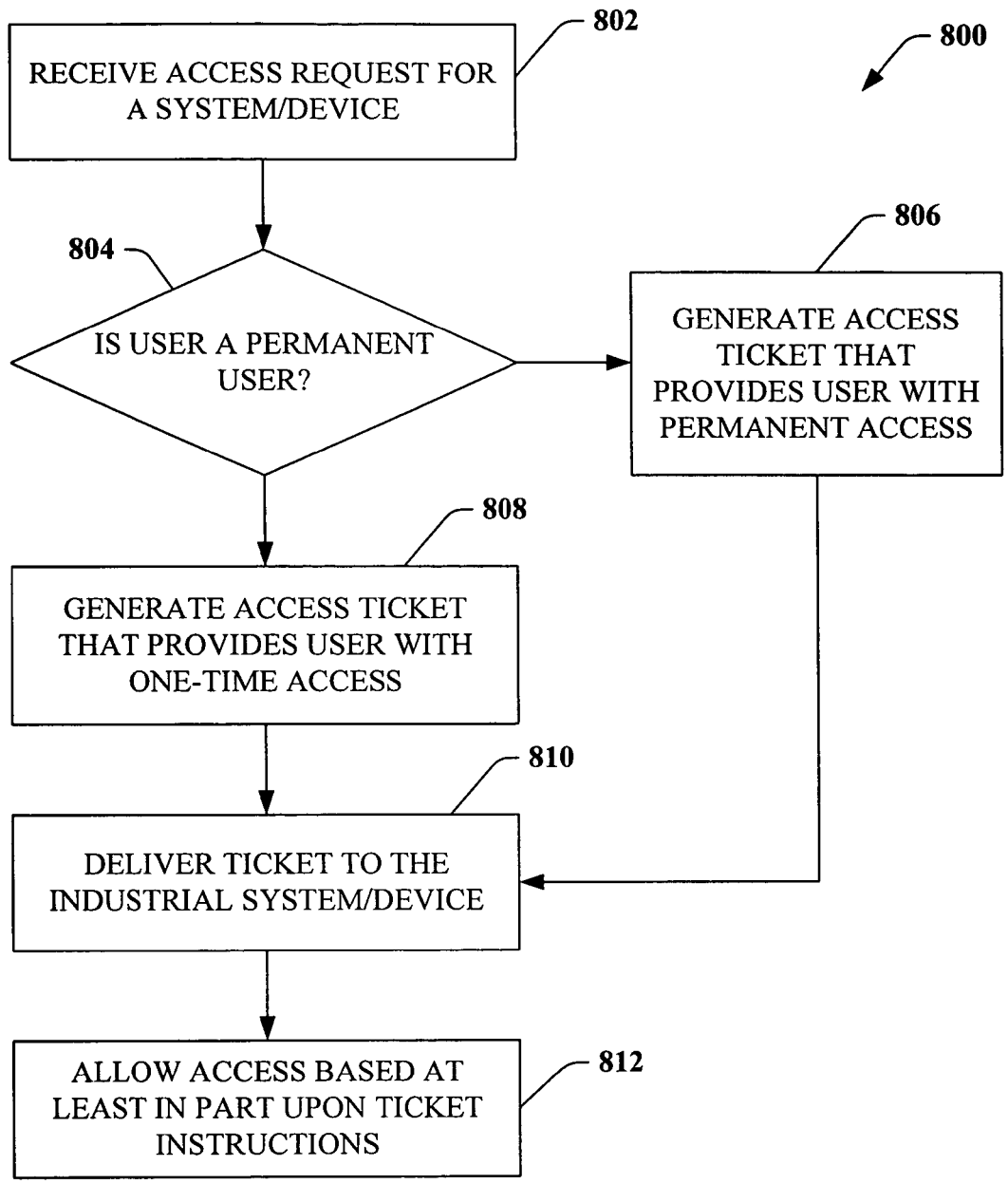
FIG. 8 is a representative flow diagram illustrating a methodology for layered temporal access rights in accordance with an aspect of the subject invention.

Turning now to FIG. 8, a methodology 800 for providing access restrictions relating to a user to an industrial system/device is illustrated. At 802, a request for access to an industrial system/device is received. As stated previously, the request can take any suitable form, including an entry of identifying indicia. At 804, a determination is made regarding whether the user initiating the request is a permanent user (e.g., a trusted technician who consistently desires access to the industrial system/device). If such user is a permanent user, at 806 an access ticket is generated that provides the user with permanent access to the industrial system/device. Thus, if the industrial system/device were to become disconnected from an access authority, the user would retain access capabilities with respect to the industrial system/device. The generated access ticket can include further access restrictions, such as times of access, locations of access, or any other suitable access restrictions.

If the user is not a permanent user, at 808 an access ticket that provides a user with one-time access is generated. For instance, the access ticket can include instructions to discard such ticket upon granting access to a user. At 810, the access ticket is delivered to the industrial system/device. At 812, access is allowed based at least in part upon access ticket restrictions. For example, access can be granted for a limited time, at specific times, for particular portions of an industrial system and/or device, etc.

Figure 9:
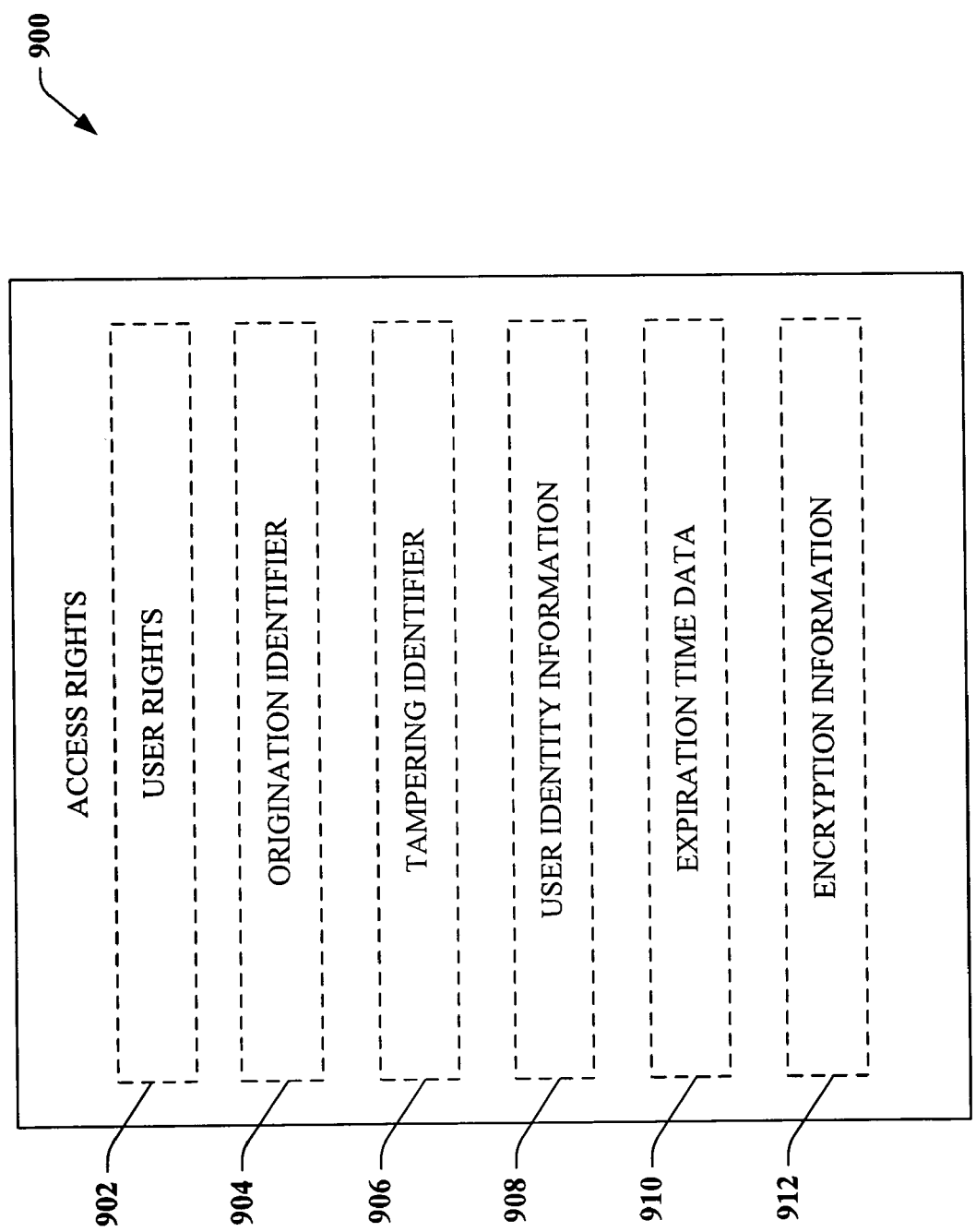
FIG. 9 is an exemplary data structure that can be utilized in accordance with an aspect of the subject invention.

Turning now to FIG. 9, an exemplary abstraction of a data structure and/or certificate 900 that can be an access ticket in accordance with the subject invention is illustrated. In accordance with one aspect of the subject invention, the data structure is a machine-readable structured document protected by conventional security formats. The data structure 900 includes user rights 902 with respect to an industrial system/device. For example, a user can be granted only particular rights to the industrial system/device, and such rights are specified within the data structure 900. Also included is an origination identifier 904, which indicates a system and/or location from which the data structure 900 was generated. Typically, for an industrial system/device to allow access to an operator, the origination identifier 904 should identify an access authority as the source of the data structure 900.

The data structure 900 further includes a tampering identifier 906 that can be analyzed by an industrial system/device to determine whether the data structure 900 has been subject to tampering. For instance, the tampering identifier 906 can be data placed in a position known only to the industrial system/device and the access authority. Alterations to such data would indicate that the access rights have been subject to tampering, and access to an industrial system/device can be denied based upon this indication. User identity information 908 can also be encoded into the data structure 900, wherein such information can include a password, PIN, biometric indicia, and any other suitable information that can be employed to identify a user. For example, an industrial system/device can receive the data structure 900 and prompt a user based upon information within the user identify information 908.

The data structure 900 can also include expiration time data 910, where a user is allowed to access an industrial system/device within a limited time frame. If an access authority and an industrial system/device are synchronized, the expiration time data can include a time where access is no longer allowed (and optionally a start-time of allowed access). Further, the expiration time data can relate to a sequence of access required by the industrial system/device, which would facilitate one-time access privileges. Moreover, encryption information 912 can be encoded within the data structure 900. For example, contents of the data structure can be encrypted, and the encryption information 912 can include keys that allow a particular industrial system/device to decrypt such information.

Figure 10:
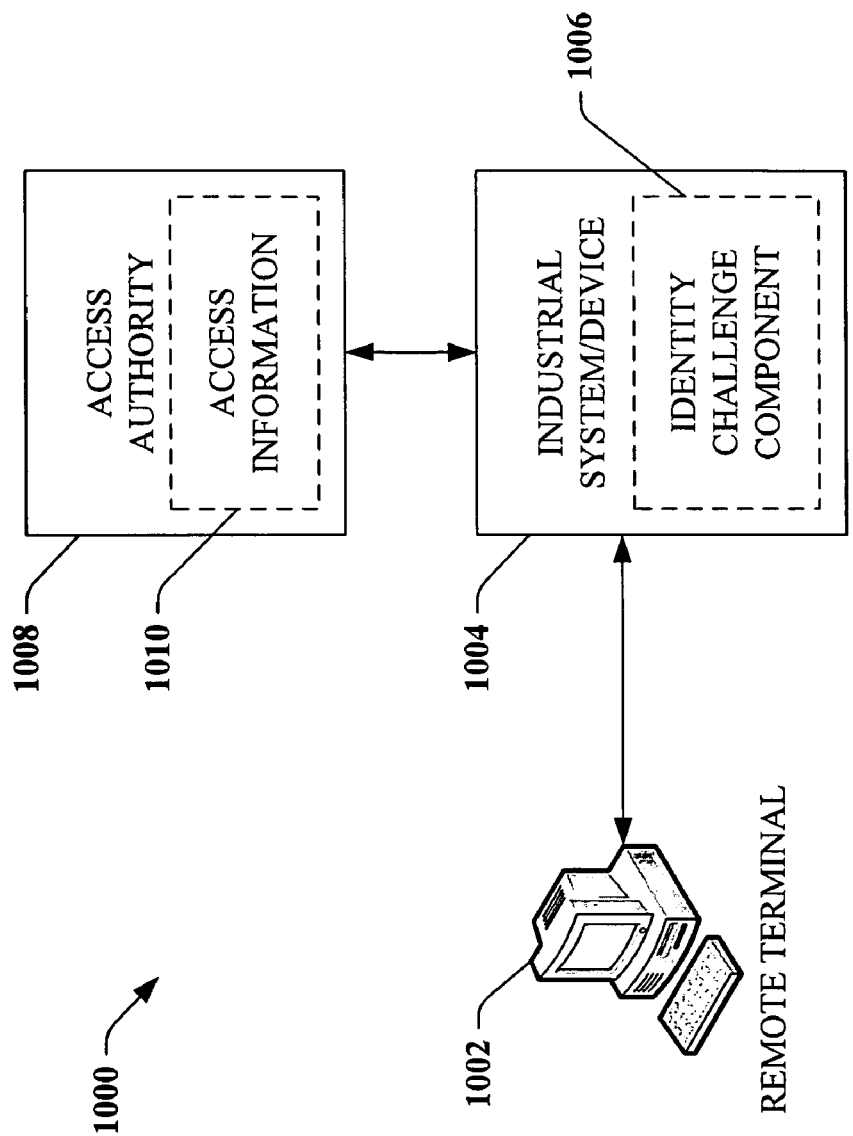
FIG. 10 is an exemplary implementation of a system that provides a remote terminal with restricted access privileges to an industrial system/device in accordance with an aspect of the subject invention.

Referring now to FIG. 10, an exemplary security system 1000 that enables an individual to obtain access to an industrial system/device remotely is illustrated. The system 1000 includes a remote terminal 1002 that can access an industrial system/device 1004 over a trusted network. For instance, the industrial system/device 1004 can be associated with a PLC and/or control logic therein. The industrial system/device 1004 is associated with an identity challenge component 1006 that is employed to prompt a user at the remote terminal 1002 to validate his/her identity. For instance, conventional usernames, passwords, PINs, and the like can be employed in connection with validating a user. Further, the remote terminal 1002 can be associated with biometric interface(s), wherein biometric information can be passed from the remote terminal 1002 to the identity challenge component 1006, which can thereafter authenticate the user. In accordance with another aspect of the present invention, an access authority 1008 can include information relating to user's identities, which can then be compared with proffered identification information given be a user of the remote terminal 1002.

Upon determining that the user identity is valid, the access authority 1008 can generate an access ticket that enables the user of the remote terminal 1002 to be associated with particular access rights. This access ticket is provided by analyzing access information 1010 associated with the access authority 1008, wherein such access information 1010 specifies access rights disparate users can be granted with respect to certain industrial systems/devices. For instance, the user of the remote terminal 1002 may have access only to a certain portion of control logic within the industrial system/device 1004 according to the access information 1010. Thus, the access authority 1008 delivers an access ticket to the industrial system/device 1004 that grants the user of the remote terminal 1002 access to only the aforementioned portion, and prevents the user from accessing other unauthorized portions of control logic. Thus, the access ticket can provide significantly more granular access restrictions than conventional security systems. Further, the system 1000 can restrict access to the remote terminal based on location. For instance, in some instances it can be desirable to render access more restricted at a remote location when compared to a technician who is on-site.

Figure 11:
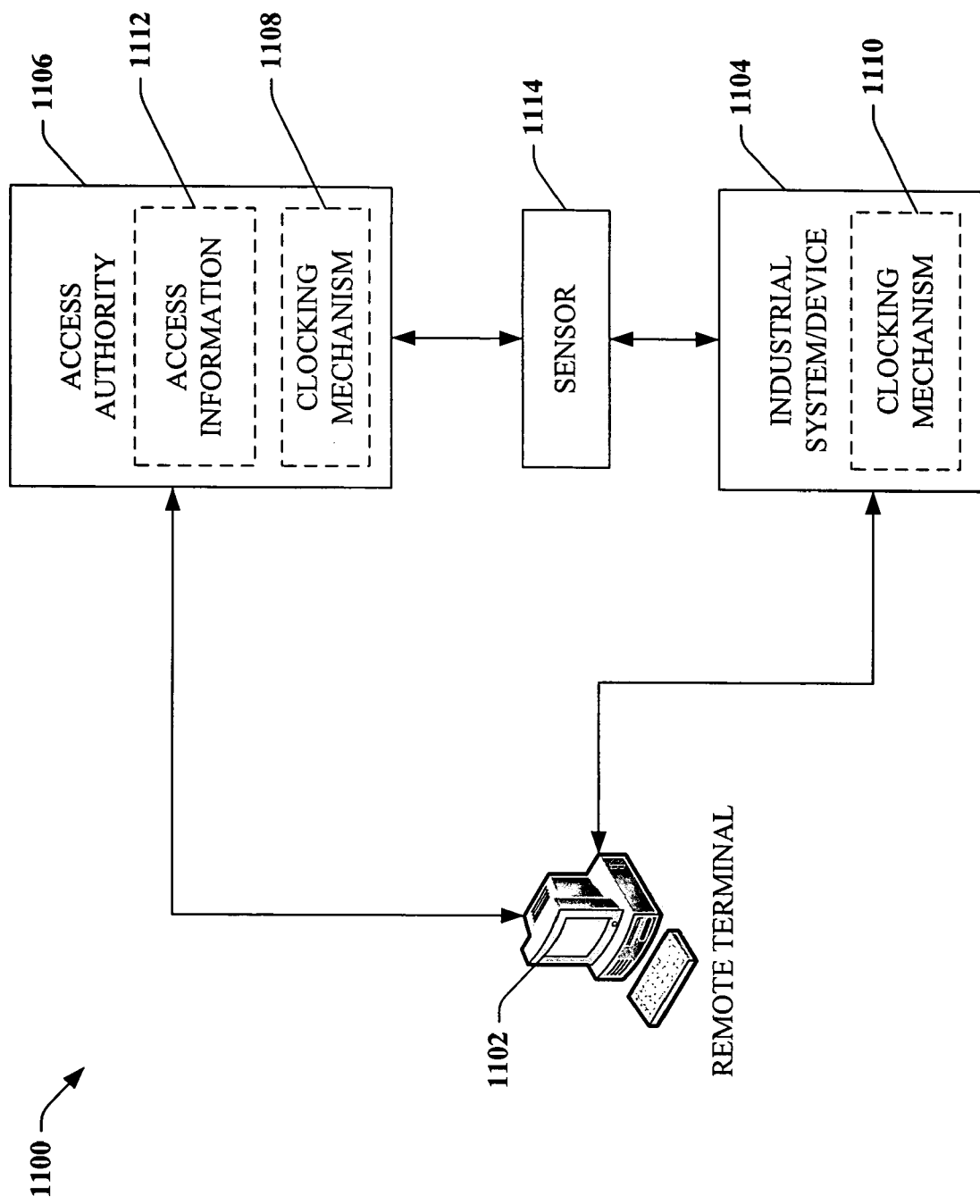
FIG. 11 is an exemplary implementation of a system that provides a remote terminal with restricted access privileges to an industrial system/device in accordance with an aspect of the subject invention.

Now turning to FIG. 11, a system 1100 that facilitates ensuring that access tickets granted to a remote device will not expire is illustrated. The system 1100 includes a remote terminal 1102 that requests access to an industrial system/device 1104. As shown, the access request can be delivered directly to the industrial system/device 1104, or in an alternative embodiment, the access for access to the industrial system/device 1104 can first be delivered to a access authority 1106. The access authority 1106 includes a clocking mechanism 1108 that is employed to timestamp access tickets generated by the access authority 1106. For instance, such timestamps can be employed with defining an expiration time for the security ticket, wherein such ticket requires renewal upon expiration. The industrial system/device 1104 likewise includes a clocking mechanism 1110 that can be employed to determine whether an access ticket has expired.

The system 1100 operates in a following manner: an access request relating to the industrial system/device 1104 initiated from the remote terminal 1102 is received by either the access authority 1106 or the industrial system/device 1104. Upon authenticating a user associated with the remote terminal 1102, the access authority 1106 employs access information 1112 associated with the industrial system/device 1104 and the user to generate an access ticket, wherein such access ticket includes restrictive attribute(s). The access ticket can also be provided an expiration time by employing the clocking mechanism 1108. In accordance with one aspect of the subject invention, the clocking mechanism 1108 of the access authority 1106 and the clocking mechanism 1110 of the industrial system/device 1104 can be synchronized when the access authority 1106 and the industrial system/device 1104 are communicatively connected. A sensor 1114 can be utilized to monitor connectivity therebetween.

The generated access ticket is passed to the industrial system/device 1104, and grants the remote terminal 1102 access to the industrial system/device 1104 according to access restrictions within the access ticket. The clocking mechanism 1110 is employed to determine whether the access ticket has expired—if such access ticket has expired according to the clocking mechanism 1110, then access will not be granted to the user of the remote terminal 1102. If the access ticket has not expired, then access will be granted to the industrial system/device 1104. Upon the sensor 1114 determining that the industrial system/device 1104 has been disconnected from the access authority 1106, the clocking mechanism 1110 is paused. This ensures that a ticket received by the industrial system/device 1104 will not expire upon the industrial system/device 1104 being disconnected from the access authority 1106. Upon the industrial system/device 1104 being reconnected to the access authority 1106, the clocking mechanism 1110 can be re-started (in contrast to re-set) and/or synchronized with the clocking mechanism 1108 of the access authority 1106.

Figure 12:
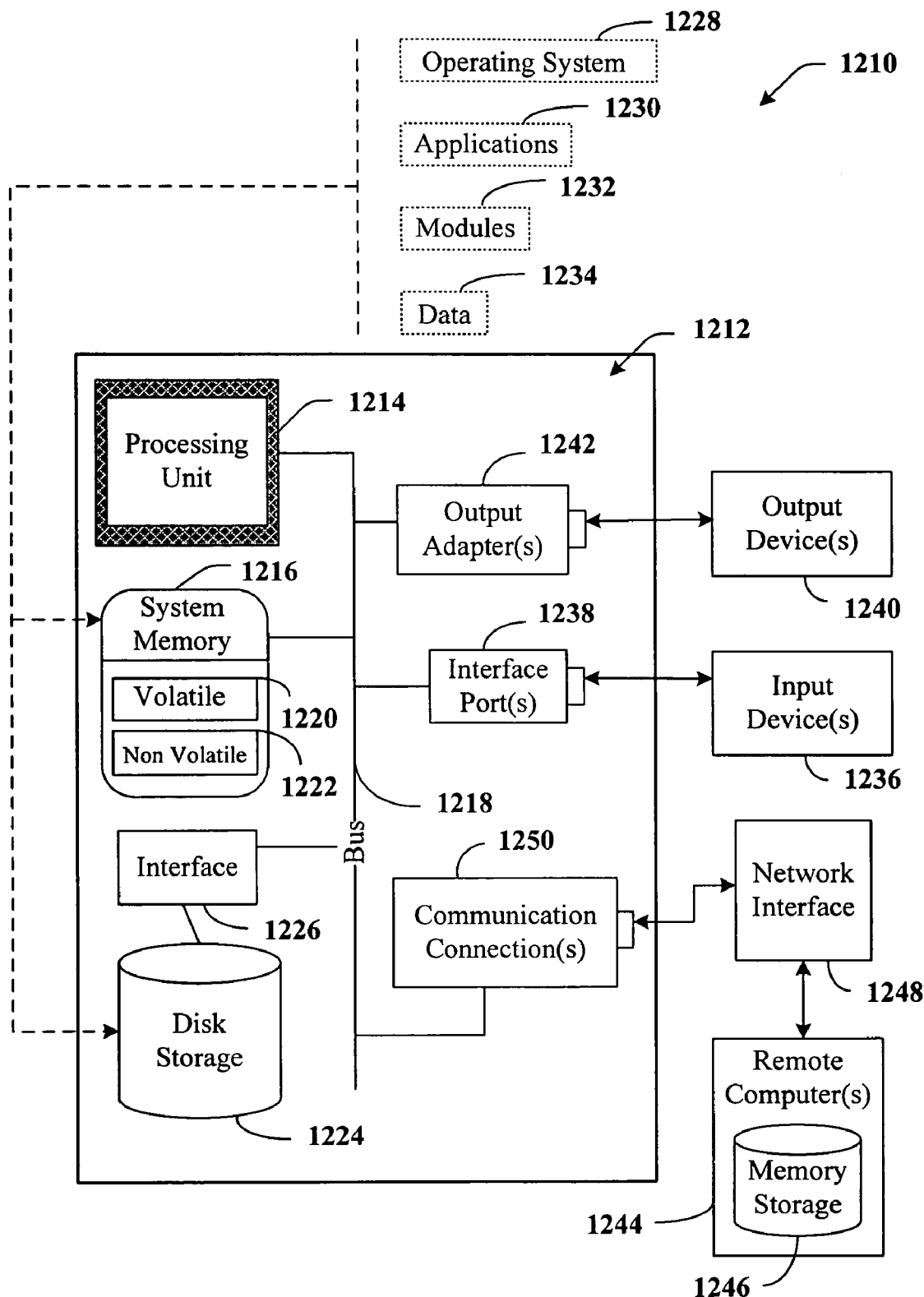
FIG. 12 is an exemplary operating environment that can be employed in connection with the subject invention.

With reference to FIG. 12, an exemplary environment 1210 for implementing various aspects of the invention includes a computer 1212. The computer 1212 includes a processing unit 1214, a system memory 1216, and a system bus 1218. The system bus 1218 couples system components including, but not limited to, the system memory 1216 to the processing unit 1214. The processing unit 1214 can be any of various available processors. Dual microprocessors and other multiprocessor architectures also can be employed as the processing unit 1214.

The system bus 1218 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1216 includes volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable ROM (EEPROM), or flash memory. Volatile memory 1220 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1212 also includes removable/non-removable, volatile/non-volatile computer storage media. FIG. 12 illustrates, for example a disk storage 1224. Disk storage 1224 includes, but is not limited to, devices like a magnetic disk drive, floppy disk drive, tape drive, Jaz drive, Zip drive, LS-100 drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to the system bus 1218, a removable or non-removable interface is typically used such as interface 1226.

It is to be appreciated that FIG. 12 describes software that acts as an intermediary between users and the basic computer resources described in suitable operating environment 1210. Such software includes an operating system 1228. Operating system 1228, which can be stored on disk storage 1224, acts to control and allocate resources of the computer system 1212. System applications 1230 take advantage of the management of resources by operating system 1228 through program modules 1232 and program data 1234 stored either in system memory 1216 or on disk storage 1224. It is to be appreciated that the subject invention can be implemented with various operating systems or combinations of operating systems.

A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port may be used to provide input to computer 1212, and to output information from computer 1212 to an output device 1240. Output adapter 1242 is provided to illustrate that there are some output devices 1240 like monitors, speakers, and printers, among other output devices 1240, which require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a personal computer, a server, a router, a network PC, a workstation, a microprocessor based appliance, a peer device or other common network node and the like, and typically includes many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1250 refers to the hardware/software employed to connect the network interface 1248 to the bus 1218. While communication connection 1250 is shown for illustrative clarity inside computer 1212, it can also be external to computer 1212. The hardware/software necessary for connection to the network interface 1248 includes, for exemplary purposes only, internal and external technologies such as, modems including regular telephone grade modems, cable modems and DSL modems, ISDN adapters, and Ethernet cards.

Figure 13:
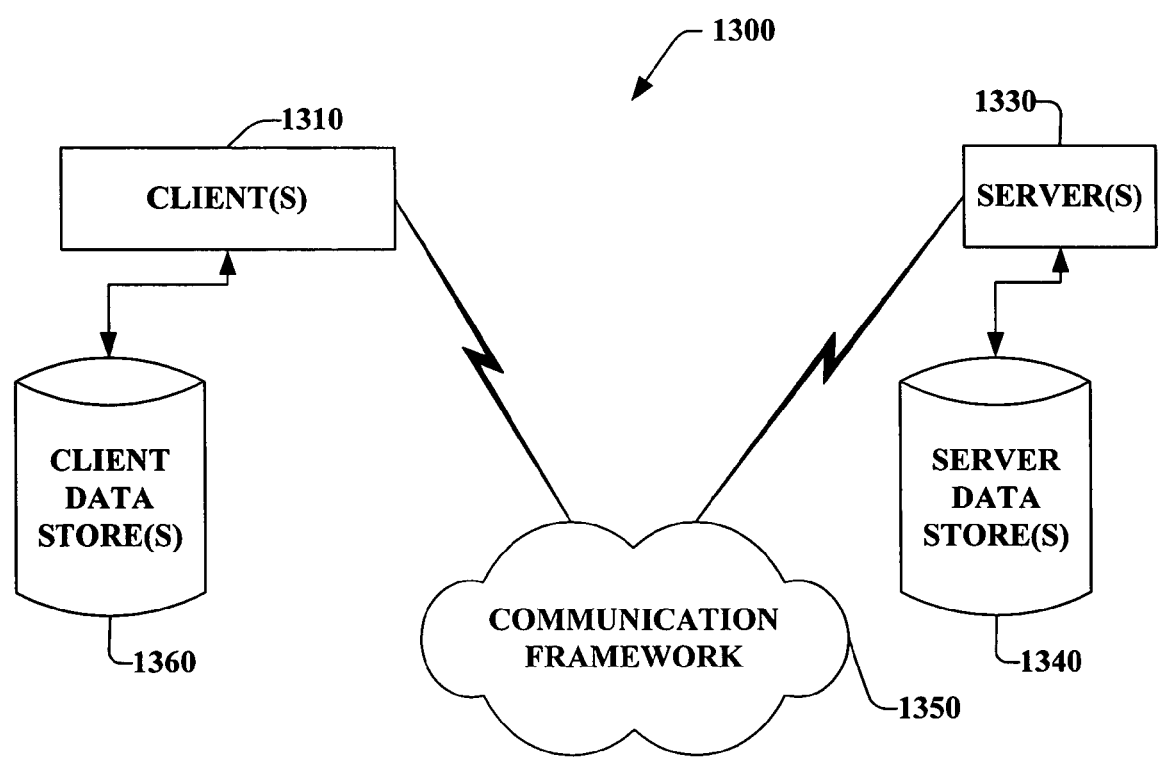
FIG. 13 is an exemplary operating environment that can be employed in connection with the subject invention.

FIG. 13 is a schematic block diagram of a sample-computing environment 1300 with which the subject invention can interact. The system 1300 includes one or more client(s) 1310. The client(s) 1310 can be hardware and/or software (e.g., threads, processes, computing devices). The system 1300 also includes one or more server(s) 1330. The server(s) 1330 can also be hardware and/or software (e.g., threads, processes, computing devices). The servers 1330 can house threads to perform transformations by employing the subject invention, for example. One possible communication between a client 1310 and a server 1330 can be in the form of a data packet adapted to be transmitted between two or more computer processes. The system 1300 includes a communication framework 1350 that can be employed to facilitate communications between the client(s) 1310 and the server(s) 1330. The client(s) 1310 are operably connected to one or more client data store(s) 1360 that can be employed to store information local to the client(s) 1310. Similarly, the server(s) 1330 are operably connected to one or more server data store(s) 1340 that can be employed to store information local to the servers 1330.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An industrial automation security system, comprising:
    an access ticket relating to an industrial automation system, the access ticket comprises one or more restrictive attributes that restrict access rights to a portion of contents of the industrial automation system, the one or more restrictive attributes correspond to properties of the industrial automation system and properties of a requesting entity;
    a component that receives the access ticket and grants access to the industrial automation system and the contents therein according to the one or more restrictive attributes; and
    a sensor that senses whether the industrial automation system is communicatively connected to an access authority that issues the access ticket.

2. The security system of claim 1, the industrial automation system comprises a programmable logic controller.

3. The security system of claim 1, the one or more restrictive attributes comprises a timeframe that a requesting entity can be granted access.

4. The security system of claim 1, the one or more restrictive attributes comprises a one-time access restriction.

5. The security system of claim 1, the access ticket is issued upon authentication of an identity of a requesting entity.

6. The security system of claim 5, the requesting entity is a human.

7. The security system of claim 5, authentication comprises analyzing at least one of a user name, a password, and a personal identification number provided by the requesting entity.

8. The security system of claim 5, authentication comprises analyzing biometric information provided by the requesting entity.

9. The security system of claim 1, the user is provided with read-only access privileges to at least a portion of the contents of the industrial automation system.

10. The security system of claim 1, the one or more restrictive attributes prevents access to at least a portion of the contents.

11. The security system of claim 1, the one or more restrictive attributes prevents a user from writing to at least a portion of the contents.

12. The security system of claim 1, the access ticket is in a form of a Kerberos ticket.

13. The security system of claim 1, the access authority and the industrial automation system comprise a clocking mechanism, the clocking mechanism of the access authority and the clocking mechanism of the industrial automation system synchronized upon the access authority and the industrial automation system being communicatively connected.

14. The security system of claim 13, the clocking mechanism of the industrial automation system pauses upon a determination that the industrial automation system is not communicatively connected to the access authority.

15. The security system of claim 14, the one or more restrictive attributes comprise a limited time of access.

16. The security system of claim 15, the limited time of access extends upon the industrial automation system and the access authority becoming communicatively disconnected.

17. The security system of claim 1, the industrial automation system comprises a clocking mechanism, the clocking mechanism counts down upon receipt of the access ticket.

18. The security system of claim 17, the industrial automation system prohibits access thereto upon the clocking mechanism counting down to a defined time.

19. A security system for industrial automation systems, comprising:
    an access authority that generates access tickets relating to one or more industrial automation devices, the access authority and the one or more industrial automation devices comprise a clock; and
    a component that pauses the clock comprised by the one or more industrial automation devices upon the one or more industrial automation devices becoming disconnected from the access authority.

20. The system of claim 19, further comprising a sensor that monitors whether the one or more industrial automation devices is connected to the access authority.

21. The system of claim 19, the clock comprised by the one or more automation devices restarted upon the one or more industrial automation devices being connected with the access authority.

22. The system of claim 19, the clock comprised by the one or more automation devices synchronized with the clock comprised by the access authority upon the one or more industrial automation devices being connected with the access authority.

23. The system of claim 19, a valid access ticket does not expire upon disconnection of the access authority and the one or more industrial automation devices.

24. The system of claim 19, the access ticket comprises restrictive attributes that restrict access to a portion of contents within the industrial automation device.

25. The system of claim 19, further comprising a user verification component that verifies that a user is authorized to access the one or more industrial automation devices.

26. The system of claim 25, the user verification component analyzes biometric data to determine whether the user is authorized to access the one or more industrial automation devices.

27. The system of claim 25, the user verification component analyzes one or more of a username, password, and personal identification number to determine whether the user is authorized to access the one or more industrial automation devices.

28. A method for securing industrial automation systems, comprising:
    receiving a request to access an industrial automation system;

verifying that an initiator of the request is authorized to access the industrial automation system;

generating an access ticket that comprises restrictive attributes based on the industrial automation system and the initiator of the request;

relaying the access ticket to the industrial automation system, the restrictive attributes limit the initiator's access to industrial automation system; and sensing whether the industrial automation system is communicatively connected to an access authority that issues the access ticket.

29. The method of claim 28, further comprising restricting access to a portion of contents associated with the industrial automation system.

30. The method of claim 28, further comprising restricting access to the industrial automation system to a single access.

31. The method of claim 28, further comprising analyzing one or more of a username, password, personal identification number, and biometric data to verify that the initiator of the request is authorized to access the industrial automation system.

32. A security system employed in an industrial automation system, comprising:

means for generating an access ticket with restrictive attributes based on the industrial automation system and a requesting entity;

means for delivering the access ticket to an industrial automation system and restricting access to the industrial automation system based at least in part upon the restrictive attributes; and means for sensing whether the industrial automation system is communicatively connected to an access authority that issues the access ticket.

33. The security system of claim 32, further comprising means for encrypting the access ticket.

* * * * *